Dec. 6, 1960 A. N. KONSTANT 2,963,169
STORAGE RACK
Filed April 21, 1958 2 Sheets-Sheet 1

INVENTOR.
Anthony N. Konstant
BY
Soans, Anderson, Luedeka & Fitch
Attys.

Dec. 6, 1960  A. N. KONSTANT  2,963,169
STORAGE RACK
Filed April 21, 1958  2 Sheets-Sheet 2
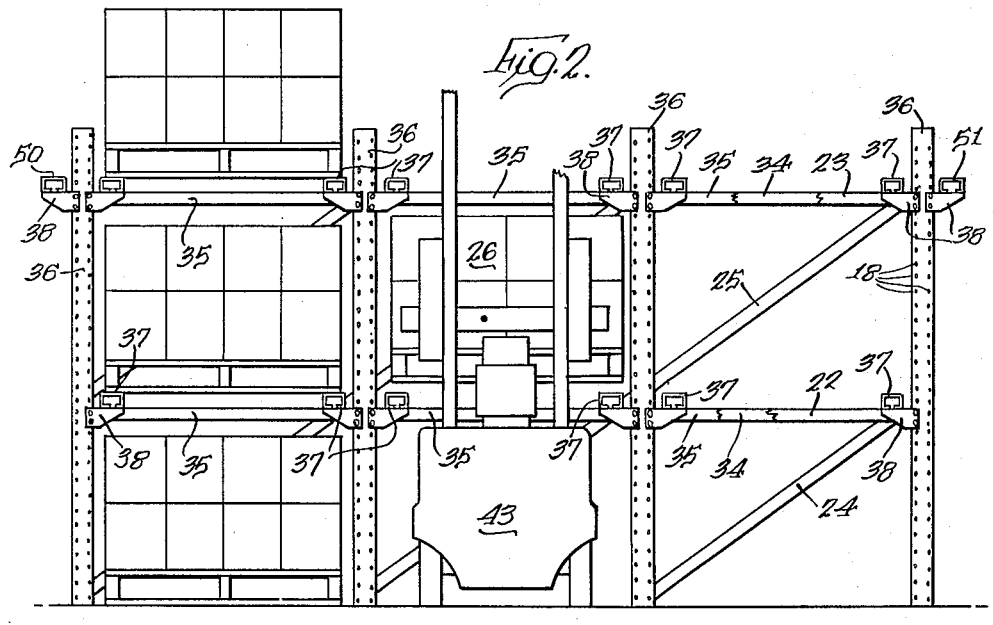
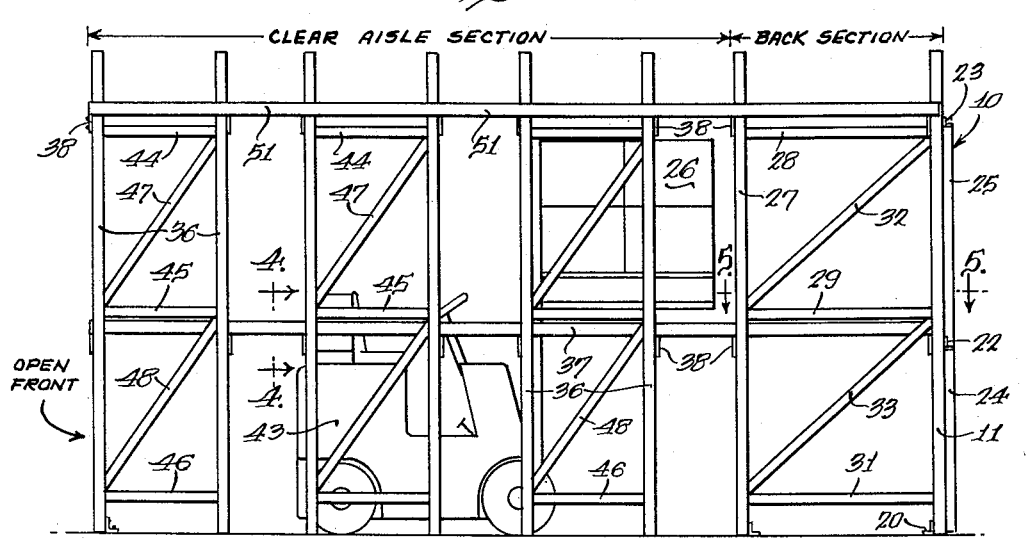
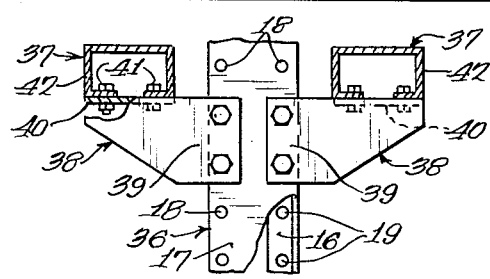
INVENTOR.
Anthony N. Konstant
BY
Soans, Anderson, Luedeka & Fitch
Attys.

United States Patent Office 2,963,169
Patented Dec. 6, 1960

2,963,169

STORAGE RACK

Anthony N. Konstant, 602 S. Main St.,
Mount Prospect, Ill.

Filed Apr. 21, 1958, Ser. No. 729,727

4 Claims. (Cl. 211—134)

The present invention relates generally to storage means and more particularly to a drive-in-rack or structure which can accommodate loads or goods of various shapes and sizes.

In the storage of goods, particularly in the case of industrial storage, it is desirable that the storage structures, such as scaffolds, storage racks, storage bins and the like, be of simple design and low cost and that they can be readily put together and taken apart. It is important that it be possible to effect high density storage, i.e. storage of large amounts of material in a small area. Furthermore, it is often highly desirable that the storage structure be made of standard components, but be adjustable to accommodate loads or goods of various sizes. In addition, it is particularly advantages to provide storage structures which are self-supporting so that the structures need not be attached to the building and which are readily accessible to lift trucks or other means for transporting the goods, so that the storage area can be entered for conveniently and quickly filling the storage area with goods in a systematical manner, and with a minimum of handling.

Conventional storage structures have not provided all of the described desirable features. In this connection, the usual storage structures, such as racks and the like, are not constructed so as to permit high density storage with quick and safe unloading and storage of goods.

The present invention provides a simple, durable and stable low cost storage structure, hereinafter sometimes termed a drive-in-rack, which may be readily put together and taken apart. The entire storage area of the drive-in-rack is accessible to a goods transporting means, such as a lift truck, so that the structure can be filled with goods quickly and conveniently in a systematic manner with a minimum effort. Furthermore, the rack can be adjusted to accommodate loads or goods of various sizes, shapes and weights. In addition, the drive-in-rack is so constructed that it can be readily enlarged by adding additional units thereto if further storage space is desired.

Accordingly, the principal object of the present invention is to provide an improved storage structure. Further objects of the present invention are to provide a readily assemblable and disassemblable drive-in-rack which is simple in construction, inexpensive, structurally stable, and durable; to provide a drive-in-rack, the entire storage space of which is readily accessible to goods transporting means and which can be loaded quickly and conveniently with minimum effort; and, to provide a drive-in-rack of the capacity which can be enlarged or reduced in a simple manner without special tools, and which is readily adjustable to accommodate goods of various sizes, shapes and weights.

Further objects and advantages will be readily apparent from the following detailed description, and from the accompanying drawings, of which:

Figure 2 is a front elevational view of the drive-in-rack of Figure 1;

Figure 3 is a side elevational view of the drive-in-rack of Figure 1;

Figure 4 is an enlarged, fragmentary, front elevational view taken on the line 4—4 of Figure 3.

Figure 1:
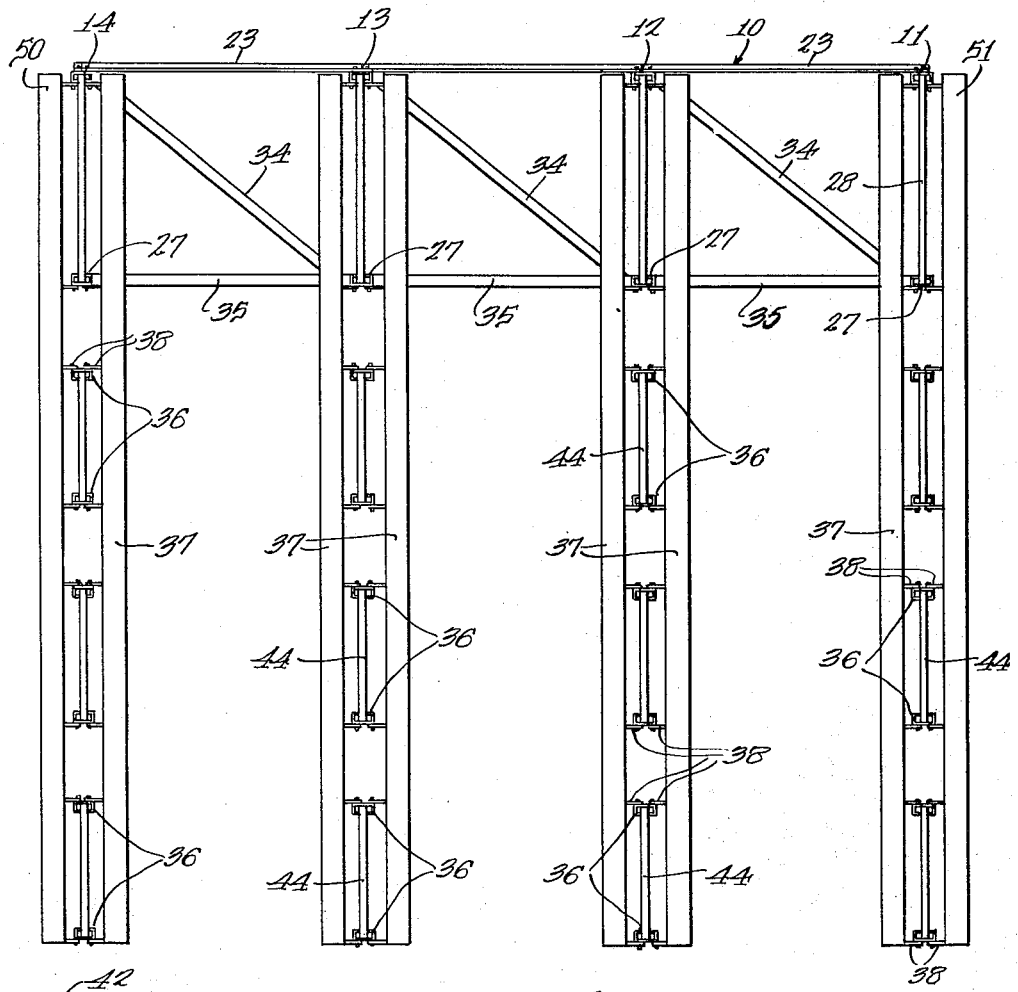
Figure 1 is a plan view of a preferred embodiment of the drive-in-rack of the present invention.

As will be seen from an examination of the drawings, in view of the description herein, the invention contemplates in its broader aspects a self-supporting structure having one or more aisles or bays for permitting entrance of a truck equipped with a device such as a fork for lifting a load. The load may comprise a merchandise unit in the form of a single article having a suitable base, or a number of articles or products or containers of the same, mounted on a base. Preferably the fork of the truck may be raised in order to lift the load off the floor or other structure, and preferably the load when lifted from the floor can be hoisted to different elevations so that it can be placed on a rack or shelf or other suitable support to position it above or below other loads previously deposited in the structure.

According to my preferred method of operation, each aisle or bay, which is entered from the front end only, is equipped with side shelves or supports such as rails extending horizontally in a direction from front to back of the structure, the space between opposed rails being a few inches less than the lateral dimension of the base of the load carried by the fork truck. In this way, the truck can pick up a load and raise it to such a height that the bottom of the base or pallet is vertically above the level of the supporting rail. Then the truck carrying the load is driven into the aisle. When the truck with its load has travelled into the aisle, the required distance, the fork is lowered, permitting the opposite lateral margins of the load to rest upon the spaced supporting rails, leaving the load in a position spanning the aisle.

The structural members forming the sides or walls of the aisle or bay, and which support the load supporting rails, may be called bents, which in the present instance separate the aisles. In order to reduce the amount of unusable area in the structure and also to economize in the amount of material used in the structure, these bents are made of a thickness which is as small as possible, consistent with proper mechanical strength and stability. However, the clear aisle width or clearance between the bents themselves should be sufficient to prevent the sides of the load from colliding with the bents when the loads are being taken into or out of the structure by the truck.

In order to stabilize the structure, without sacrificing storage space, I prefer to close the back or rear end of the structure with what can be termed a back fence constituting the rear boundary of the innermost storage spaces. It is not necessary for any part of the truck or its mechanism, except the fork, to enter the back storage space in the structure in order to deposit loads in the tiers of rear compartments or cells. Therefore, the parts of the structure on the back and sides can be adequately braced to make the structure stable in every direction.

The method and structure shown and described herein is particularly useful for the storing of loads which, in order to economize in storage area, must be stored or stacked on top of each other. In many cases, it is not feasible to stack the loads in piles or tiers in which the upper loads are supported by the lower loads. In the first place, the load may consist of rather fragile articles or packages which are not capable of supporting very much weight without collapsing, and in the second place, it may not be possible to pile the articles or packages on the pallet or skid in such a way as to provide a firm, level support for the pallet or skid which forms the base of an upper load. This problem does not arise in my storage structure, wherein every load has its own individual support which is part of the structure itself, and is quite independent of any other load below it.

The drawings are intended to portray one way of providing a structure of the general character described, which has storage capacity for nine loads in the back wall of the fence section. The aisles in the forward section are three or four times as long as the front-to-back depth of the load spaces in the back fence, so that the forward section will accommodate three or four times as many loads as can be put into the back section.

The various elements of which the structure is made will now be described.

Figure 5:
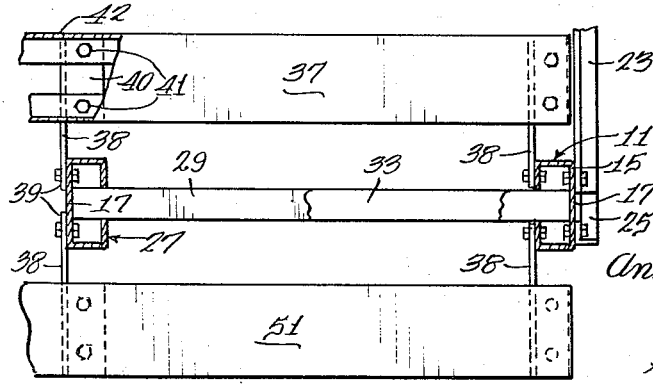
Figure 5 is an enlarged, fragmentary, sectional plan taken on the line 5—5 of Figure 3.

The wall or fence 10 at the back of the structure, as shown best in Figures 1 and 2, includes a series of four uprights 11, 12, 13 and 14, which, as shown best in Figure 5, are in the form of steel channels 15 having reentrant flanges 16. The webs 17 of these channels 15 are punched with a series of pairs of holes 18 (see Figure 4), with preferably corresponding holes 19 in the reentrant vertical flanges 16. The purpose of the series of holes is to permit the basic elements of the structure to be adjusted to suit loads of different heights without the necessary boring of any holes on the job. The lower ends of the uprights 11, 12, 13 and 14 may be formed with feet or floor lugs 20 so that the bottom ends of the uprights, if desired, may be anchored to the floor of the storage warehouse by suitable means such as bolts or screws.

To prevent lateral movement or sway of the uprights 11, 12, 13 and 14 in the line of the back fence 10, suitable bracing may be employed. This may include horizontally extending members 22 and 23, and diagonal members 24 and 25 (see Figure 2), the ends of which are united to the rear faces of the uprights 15. If desired, the members 22 to 25 inclusive, as is the case with other spacing or bracing means in the structure, may be constructed of angle iron or other shape which will enable the same to function as struts or as tie-bars with equal efficiency.

As shown best in Figure 1, in front of each of the uprights 11, 12, 13 and 14, and spaced therefrom a distance approximating the depth of one of the loads 26 (see Figure 3), there is arranged a row of columns 27. These columns, as best shown in Figure 3, are preferably individually braced to the rear or back fence uprights 11, 12, 13 and 14, by substantially the same type of bracing elements by which said uprights 11, 12, 13 and 14 are themselves braced. For example, one may use horizontally extending elements 28, 29 and 31 for maintaining the columns 27 parallel with the rear uprights, with diagonals 32 and 33 to prevent the rows of uprights and the rows of columns from swaying forward or backward.

Referring now to the plan view in Figure 1, it will be seen that the four columns 27 are braced against lateral swaying or racking by means of diagonals 34. There is a set of these three diagonals 34 at the top of the structure, and also at an intermediate height in the structure and located in zones just below the supports for the loads which are placed above said diagonals, so that these diagonals 34 will not interfere with the introduction of loads into the load spaces in the back section. The same is true of the transverse spacing bars 35, which maintain the lateral spacing between the columns 27.

The load supporting means will now be described. Referring now to Figure 5, it will be seen that the columns 27 are of the same type of construction and size as the columns 15. In fact, all of the back uprights 11, 12, 13 and 14 and the columns 27 and the posts 36 in the aisle walls or bents may be constructed of the same kind of channels, similarly drilled, which is a considerable advantage in manufacturing and assembling a structure of the kind and for the purpose described. This is also true of the rails 37 (see Figure 4) on which the loads are supported. Each of these rails 37 preferably extends from the back fence 10 to a post at the entrance to the front of the aisle, and may be supported by each of the vertical members of the structure in substantially the same manner.

Referring now to Figures 4 and 5, it will be seen that on each of the back uprights 11, 12, 13 and 14, and on each of the columns 27, and on each of the posts 36 in front of the columns 27, there are secured brackets 38. Each of these brackets 38 has a vertically extending flange 39 (see also Figure 5), which is secured to suitably located holes in the vertical channel members. These brackets 38 extend into the aisle space opposite similar brackets which are similarly mounted on the vertical channel members on the other side of the aisle. However, the distance between the opposed inner ends of these brackets 38 on opposite sides of the aisle is sufficient so that the fork truck and its elevator may pass between the brackets, although the load itself and its supported base is wider than the distance between the ends of the brackets.

On that portion of the bracket 38, which extends into the aisle space, there is formed a flange such as is shown at 40 in Figure 5, which flange 40 is used as a support for the rail 37. To anchor the rail 37 securely in place, a pair of bolts 41 may be employed which serve to firmly clamp the rails 37 to the brackets 38. Preferably, the inner faces or edges 42 of the rails 37 do not extend beyond the inner edges or ends of the brackets 38, so that they also will not interfere with the operation of the fork truck 43.

In the present instance, each forward and backwardly extending bent or wall constituting a part of the back wall section and the clear aisle section of the structure comprises, in addition to the back fence uprights 11, 12, 13 and 14, a similar number of truck columns 27 for the back section, and a set of three pairs of posts 36 constituting the supports for the loads in the aisle sections. These pairs of posts 36 are braced together by means similar to those employed in the case of the side walls of the back section of the structure. For example, each pair of posts may be spaced apart by a set of three horizontally extending members 44, 45 and 46, while forward and backward movement in the bent is prevented by means of diagonals 47 and 48.

It should be noted that in addition to serving as shelves upon which the upper loads are supported, the rails 37 which extend from front to back of the structure serve to maintain proper spacing between the vertical elements. Also, the rails serve to prevent the outer, i.e. the forwardly positioned posts in the structure at the entrance particularly, from swaying laterally. In actual practice, it is found that when these rails are continuous from back to front of the structure and firmly bolted to all of the brackets by which they are supported, the aisles or bays may extend forwardly a substantial distance and in one commercial installation extend to a point about thirty feet from the back fence of the structure so as to accommodate a line of 10 pallets.

Owing to the fact that the outer bents have brackets and supporting rails only on one side, a single set of supporting rails may not be sufficient to prevent lateral swaying of the outer posts 36 at the entrance to the aisle. For that reason, when the clear aisle space is quite long, without any other additional lateral support, it is advisable to place on the outside of the outer bents, at the upper edge or corner thereof, additional brackets and additional rails 50 and 51, which in most cases will be sufficient to prevent the front ends of the bents from swaying significantly.

My improved structure, as compared with the usual arrangement in which the entire aisle must always be kept clear for the handling of loads arranged in a single tier on either side of the aisle, constitutes a saving in floor space which is extremely important, in addition to which the structure itself is not expensive. It needs no support from the ceiling or the walls of the warehouse, and it can be as high as necessary to accommodate the maximum lift of load by the most advanced type of fork truck.

Furthermore, as has been explained, it is capable of quick adaptation for the handling of loads of different heights and widths. It will handle a load having a base of any reasonable length. If the loads and bases have the right lateral width to span the rails, any number of loads can be forked in until the aisle is filled up.

Various of the features of the invention believed to be new and different are set forth in the appended claims.

I claim:

1. A rack structure adapted for storing a plurality of superposed upper and lower merchandise loads, each provided with a base having longitudinally spaced ends and laterally spaced sides, comprising a self-supporting structure which includes a back fence having spaced uprights, bracing in the fence and between said uprights to prevent lateral racking of said uprights in the line of the fence, a plurality of spaced columns arranged forwardly of, and spaced from said uprights, bracing between the fence and the forward columns to prevent the fence and the columns from swaying forwardly or rearwardly, horizontally disposed bracing means between the fence and the columns for preventing lateral racking of the forward columns, said forward columns being spaced to admit loads, and rails carried by and extending forwardly between the fence and the columns for supporting the base of an upper superposed load independently of an underlying lower load and spaced to admit the forks of a truck, while providing supports for the lateral edges of the load base, said last mentioned bracing means being positioned in a zone extending over a load space whereby the said spaced columns and said fencing become a unitary, self-supporting, substantially non-swayable storage rack structure.

2. A rack structure adapted for storing a plurality of superposed upper and lower merchandise loads, each provided with a base having longitudinally spaced ends and laterally spaced sides, comprising a self-supporting structure which includes a back fence having spaced uprights, bracing in the fence and between said uprights to prevent lateral racking of said uprights in the line of the fence, a plurality of spaced columns arranged forwardly of, and spaced from said fence, bracing between the fence and the columns to prevent the fence and the columns from swaying forwardly or rearwardly, horizontally disposed bracing means between the fence and the columns for preventing lateral racking of the columns, said columns being spaced to admit loads, means carried by and extending between the fence and the columns for supporting an upper superposed load independently of an underlying lower load, said last mentioned bracing means being positioned in a zone extending over a load space, vertical posts spaced sufficiently from each other to form a clear aisle for admitting the loads which are to be placed in the load spaces between the back fence and the columns, said posts being positioned a sufficient distance from the columns to provide a bay for loads in front of the back load space, and oppositely disposed load-supporting rails in said bay respectively mounted on said posts, spaced apart a distance less than said lateral spacing between the sides of the load base, and having their rear ends rigidly connected to said columns, whereby horizontal movement of the front ends of said rails is substantially prevented.

3. The subject matter of claim 2, in which said rails extend rearwardly to the back fence and are rigidly connected to said uprights.

4. A rock structure adapted for storing self-supporting merchandise loads each provided with a base having longitudinally spaced ends and laterally spaced sides, comprising a self-supporting structure having a front with an entrance, a back forming a fence, and a pair of wall bents connecting the front and back of the structure and spaced apart to provide a clear aisle open at the front end only for passage of a vehicle used in transporting the loads longitudinally into or out of the aisle between said bents, said bents having opposite load supporting rails projecting into said aisle and extending horizontally and longitudinally from back to front of the structure along the opposed sides of said bents, and spaced apart a distance less than said lateral spacing between the sides of the load base, said rails being long enough to support the bases of at least two loads placed end to end on said rails, each of said bents including a rear upright, an intermediate column and a front post, and means for bracing the same to keep them from swaying forwardly or rearwardly, bracing means between said uprights for preventing side sway of the upper ends of said uprights, and bracing means between the uprights and the columns in a zone located above a load space, to prevent lateral sway of the columns.

References Cited in the file of this patent

UNITED STATES PATENTS

| | | |
|---|---|---|
| 750,645 | Hart | Jan. 26, 1904 |
| 1,552,210 | Bussler | Sept. 1, 1925 |
| 2,577,276 | Saul | Dec. 4, 1951 |
| 2,685,972 | Eisenhard | Aug. 10, 1954 |
| 2,815,130 | Franks | Dec. 3, 1957 |